Feb. 8, 1938. J. W. BRANDT ET AL 2,107,561
CYCLE SADDLE
Filed Dec. 9, 1935
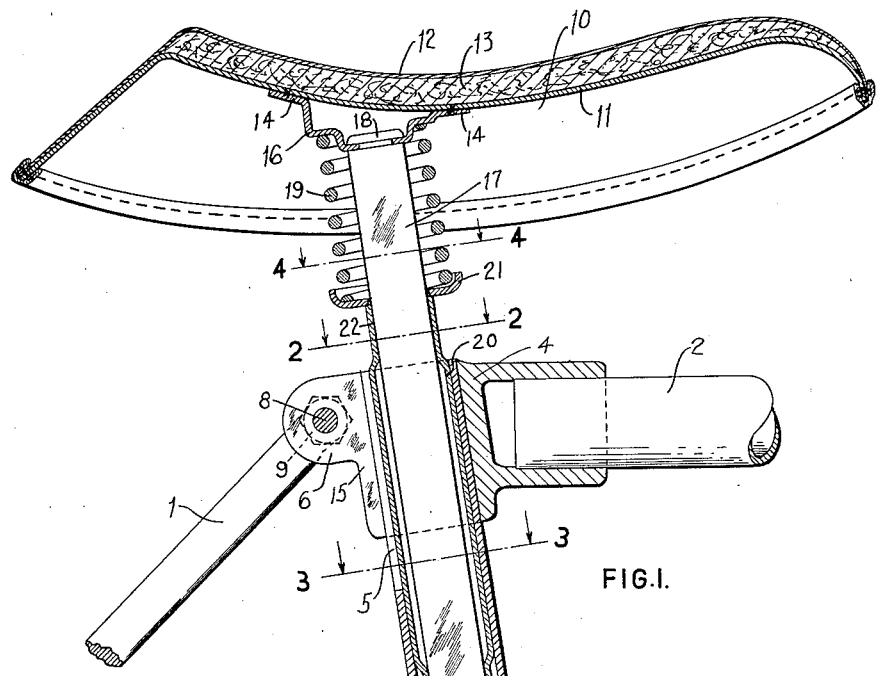
FIG.I.
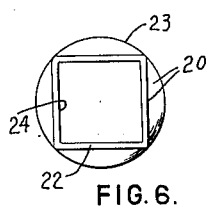
FIG.6.
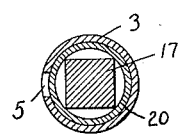
FIG.3.
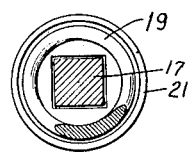
FIG.4.
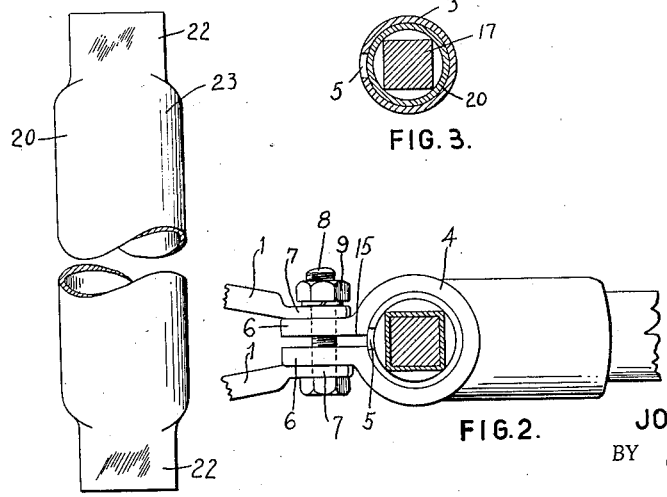
FIG.5. FIG.2.
INVENTOR.
JOHN W. BRANDT
AND ANDREW J. LINDER
BY
Their ATTORNEYS Patented Feb. 8, 1938

2,107,561

UNITED STATES PATENT OFFICE 2,107,561

CYCLE SADDLE

John W. Brandt and Andrew J. Linder, Elyria, Ohio, assignors to The Troxel Manufacturing Company, Elyria, Ohio, a corporation of Ohio Application December 9, 1935, Serial No. 53,491

3 Claims. (Cl. 155—5.19)

Our invention relates to cycle saddles and relates more particularly to cycle saddles of a type adaptable for use on velocipedes and bicycles, although not limited to such use.

Heretofore, velocipedes and bicycle saddles have commonly involved a relatively complicated resilient spring seat supporting structure involving a longitudinally extending truss element and commonly also requiring a pair of coiled springs supporting the rear of the saddle on the rear ends of such truss member, a saddle post to an arm of which the truss member is removably affixed by means of a saddle clamp, the forward end of the truss member being affixed to the forward end of the saddle. Such constructions are expensive to manufacture and maintain and, moreover, are ordinarily not presentable in appearance.

An object of the present invention is to provide a simplified resilient supporting structure for a cycle saddle preferably involving the use of a single spring preferably encircling the upper end of the saddle post whereby the saddle may yield substantially vertically according to the weight of the rider and also to minimize the jolting effect of traveling of the cycle over rough surfaces.

Another object of our invention is to provide a cycle saddle seat support which will be efficient in operation and economical to manufacture and which at the same time will not detract from the otherwise presentable appearance of the cycle saddle.

Another object of our invention is to provide an improved resilient supporting means for a cycle seat, employing parts which may be inexpensively and expeditiously manufactured and assembled without the use of expensive machinery, tools, dies, and the like, or requiring the work to be done by highly skilled labor.

Other objects of our invention and the invention itself will become more readily apparent to those skilled in the art to which our invention pertains by reference to the accompanying drawing illustrating one embodiment of our invention and by reference to the accompanying description of the said embodiment.

Referring now to the drawing:

Fig. 1 illustrates mostly in vertical longitudinal medial section, an embodiment of our invention as applied to the frame of a bicycle and supporting a typical cycle saddle seat.

Fig. 2 is a section taken on the line 2—2 of Fig. 1.

Fig. 3 is a section taken on the line 3—3 of Fig. 1.

Fig. 4 is a section taken on the line 4—4 of Fig. 2.

Fig. 5 is a side elevation of a tubular saddle post guide employed in the said embodiment.

Fig. 6 is a top plan view of the element of Fig. 5.

Referring now to the different figures of drawing illustrated one embodiment of our invention, and more particularly referring to Fig. 1, I show in this figure frame members 1, 2, and 3, each tubular in form and included in the ordinary so-called diamond bicycle frame. At 4 there is shown a frame junction element into a forwardly extending hollow lug whereof the rear end of the frame member 2 is securely fitted, and which is provided with a tubular bore into which there is tightly secured the upper end of the tubular frame member 3, the rear wall of which is split as at 5.

The rear wall of the frame junction element 4 is provided with a longitudinal slot at 15 which aligns with the split 5, of the rear wall of the junction element and terminates rearwardly in a pair of laterally spaced clamping lugs 6. The space between such lugs comprises a continuance of the slit 5 of the tubular frame member rear wall. The frame member 1 comprises duplicate tubular frame elements each of which terminates in a perforated end such as 7, arranged on the outer sides of and embracing the lugs 6.

The bolt 8 passes through aligned apertures of the frame member ends 7 and lugs 6, whereby by means of the clamping nut 9 and bolt 8, the entire assembly is compressed to draw the lugs 7 closer together and this, at the same time in the ordinary manner, diminishes the transverse diameter of the bore into which there has been telescoped the upper end of the tubular frame member 3.

The description so far relates merely to the ordinary bicycle frame construction provided for the reception and clamping of a bicycle saddle post, which ordinarily, as is well-known, is in the form of a rod of angularly bent circular cross-sectional form. The description will now proceed more particularly with the modified saddle post and spring assembly adapted to resiliently support the cycle frame.

The cycle saddle is shown generally at 10 and preferably comprise a sheet metal frame 11 and a leather or like flexible cover 12, placed over said frame with the usual cushioning material 13 disposed therebetween. At the bottom surface of an intermediate portion of the frame element 1, there is secured by welding, or otherwise, flanges 14 of a post carrying member 16. The post 17 is preferably of square or other non-circular cross-sectional form and is riveted at its upper end at 18 to an intermediate portion of the member 16.

A preferably helical spring 19 is telescoped over the post 17 until its upper end bears against the bottom surface of the member 16, suitably formed as illustrated to maintain the spring 19 substantially coaxial with the post 17.

Then there is successively telescoped upwardly on the post 17, a tubular post guiding casing 20, there being an intermediate annular dished spring support element 21 interposed between the upper end 22 of the casing 20 and the bottom convolution of the spring 19, whereby the spring 19 is confinedly held in substantially axial relationship with the post 17 between the elements 16 and 21.

The guiding casing 20 is illustrated in Figs. 5 and 6 at 23, as being intermediately and for most of its length of cylindrical form, and having its upper ends pressed to a non-circular form herein shown as being square in transverse section. The square bore 24 at the two ends 22 of the casing 23 is just enough larger than the square post 17 that said post may be readily reciprocated freely through the two squared bored portions 24 without undue friction. The lower end of the post 17 shown in Fig. 1 as projecting beyond the lower end of the casing 20, is transversely bored to permit the pin 25 to be passed therethrough and to project from either side thereof so as to engage with the lower squared end 22 of the casing 23 upon upward movements of the saddle.

The provision of the retaining pin 25 makes the cycle saddle with the post 17, spring 19, casing 20 and spring support 21, a unitary assembly of parts which can be removably affixed to any standard type cycle frame and replaced whenever desired.

The casing 20 is adapted to be clamped by operation of the bolt 8 and the nut 9 in any desired position so as to raise or lower the saddle for riders of various sizes. Also by loosening the nut 9 on the bolt 8, the entire assembly may be removed, and if desirable, removal of the pin 25 will permit the substitution of a different spring 19 which may be lighter or heavier for lighter or heavier riders.

In use, the cycle saddle is adapted to variably compress the spring 19 according to the weight of the rider on the amount of the up-and-down jolting movement imparted by the terrane to the cycle in a manner that will be well understood from the above description of the mechanism.

Having thus described our invention which is herein illustrated, we contemplate that numerous and extensive departures may be made from the embodiment herein illustrated, but without departing from the spirit of our invention.

We claim:

1. In a cycle saddle the combination with a cycle seat, a saddle post, a post supporting member to which the upper end of said post is rigidly secured and to which the seat is secured, a tubular post receiving and guiding casing adapted to be adjustably telescoped within the saddle post receiving tube of a cycle frame and to be rigidly secured therein, a radially extending flange supported by the upper end of said casing, and a coiled spring telescoped over said post and interposed between said post supporting member and said flange; said saddle post projecting within and said casing and having its lower end portion in said casing freely reciprocable therein during use of the saddle, said post and casing having inter-engaging surfaces relatively so formed as to prevent rotational movement of said post in said casing.

2. In a cycle saddle the combination with a cycle seat, of a tubular casing adapted to be adjustably telescoped within a portion of a cycle frame and be rigidly secured therein, a radially extending flange supported by the casing, an element secured to the under side of the cycle seat, spring means interposed between said element and said flange to resiliently support the cycle seat, and a saddle post rigidly secured to said element and supported thereby, the saddle post having a lower portion freely reciprocable within the casing during use of the saddle, and the post being non-rotatable relative to the casing.

3. In a cycle or the like saddle, the combination with a cycle seat of a metal element rigidly secured to the under side of the seat, a tubular casing, a radially outwardly extending flange supported by the casing, the casing being adapted to be adjustably mounted in a cycle frame, a coiled spring having its lower convolution seating upon said flange and its upper convolution engaging the metal element to resiliently support the seat, a saddle post rigidly connected to the metal element and supported thereby, and the post lower portion being freely reciprocal in the casing but non-rotatable therewith.

JOHN W. BRANDT.
ANDREW J. LINDER.